United States Patent [19]

Baba et al.

[11] Patent Number: 4,998,449
[45] Date of Patent: Mar. 12, 1991

[54] DUTY SOLENOID VALVE CONTROL SYSTEM FOR AN AUTOMATIC TRANSMISSION

[75] Inventors: Fumiaki Baba; Jyujiro Oda, both of Hiroshima, Japan

[73] Assignee: Mazda Motor Corporation, Hiroshima, Japan

[21] Appl. No.: 342,855

[22] Filed: Apr. 25, 1989

[30] Foreign Application Priority Data

Apr. 27, 1988 [JP] Japan .................. 63-105116

[51] Int. Cl.$^5$ ............................................. B60K 41/18
[52] U.S. Cl. ..................... 74/844; 192/82 T
[58] Field of Search ............... 74/844; 192/82 T; 251/129.08

[56] References Cited

U.S. PATENT DOCUMENTS

| | | | |
|---|---|---|---|
| 4,468,988 | 9/1984 | Hiramatsu | 192/82 T |
| 4,762,213 | 8/1988 | Watanabe | 192/82 T |
| 4,779,489 | 10/1988 | Haley | 74/844 |
| 4,843,913 | 7/1989 | Miyawaki | 74/844 |

FOREIGN PATENT DOCUMENTS 58-46248  3/1983  Japan .

Primary Examiner—Dirk Wright
Attorney, Agent, or Firm—Sixbey, Friedman, Leedom & Ferguson

[57] ABSTRACT

In an automatic transmission, a hydraulic pressure control valve produces hydraulic pressure according to a pilot pressure fed thereto. A duty solenoid valve controls the pilot pressure. An oil temperature sensor detects the temperature of the hydraulic oil and a driving period changing circuit changes the driving period of the duty solenoid valve according to the temperature of the hydraulic oil so that the driving period is long when the temperature of the hydraulic oil is low and short when the temperature of the hydraulic oil is high.

3 Claims, 6 Drawing Sheets

DUTY SOLENOID VALVE CONTROL SYSTEM FOR AN AUTOMATIC TRANSMISSION

BACKGROUND OF THE INVENTION

1. Field of the Invention

This invention relates a duty solenoid valve control system for an automatic transmission.

2. Description of the Prior Art

As is well known, in an automatic transmission, the gear-shifting is effected by the alternate engagement and disengagement of friction elements such as a clutch, a brake and the like. The friction elements are actuated by hydraulic control valves which control the hydraulic pressure to be fed to the friction elements according to the pilot pressure given thereto.

Generally, the friction element is engaged when a hydraulic pressure higher than a predetermined value is fed thereto, and is disengaged when the hydraulic pressure fed thereto is lowered. It has been proposed as disclosed, for instance, in Japanese Patent Publication No. 62(1987)-18780 to carefully control the hydraulic pressure to be fed to the friction element by use of a duty solenoid valve which controls the pilot pressure given to the hydraulic control valve, thereby smoothly effecting the alternate engagement and disengagement of the friction element, and suppressing torque shock when the gears are shifted.

However, there is a problem in that the hydraulic pressure control properties change with the viscosity of the hydraulic oil which changes with temperature. The hydraulic pressure control properties are evaluated on the basis of the pressure regulation performance, the hydraulic pressure oscillation and the response performance.

In FIG. 6, line A1 is a pilot pressure change curve (a curve representing the change in the pilot pressure with duty cycle of the duty solenoid valve) for a hydraulic oil temperature of 80° C. and a long driving period (frequency of 35 Hz), and curve V1 shows a pilot pressure oscillation waveform for a hydraulic oil temperature of 80° C. and a long driving period (frequency of 35 Hz). Line A2 is a pilot pressure change curve for a hydraulic oil temperature of 80° C. and a short driving period (frequency of 70 Hz), and curve V2 shows a pilot pressure oscillation waveform for a hydraulic oil temperature of 80° C. and a short driving period (frequency of 70 Hz). Line A3 is a pilot pressure change curve for a hydraulic oil temperature of −10° C. and a long driving period (frequency of 35 Hz), and curve V3 shows a pilot pressure oscillation waveform for a hydraulic oil temperature of −10° C. and a long driving period (frequency of 35 Hz). Line A4 is a pilot pressure change curve for a hydraulic oil temperature of −10° C. and a short driving period (frequency of 70 Hz), and curve V4 shows a pilot pressure oscillation waveform for a hydraulic oil temperature of −10° C. and a short driving period (frequency of 70 Hz).

The duty solenoid valve regulates the pilot pressure by draining the hydraulic oil in response to receipt of an ON-signal, and the pilot pressure oscillation waveform curves V1 to V4 represent the change in the pilot pressure which occurs in response to the opening and closure of the duty solenoid valve.

A controller determines the value of a duty signal, which is expected to produce a target pressure, on the basis of the pilot pressure change curve selected according to the oil temperature and the driving frequency, and inputs the duty signal into the duty solenoid valve. The pressure regulation performance is evaluated on the basis of the deviation of the pilot pressure actually obtained in response the duty signal from the target pressure. The value of the duty signal determined by the controller is converted into an electric signal and then input into the duty solenoid valve. Since an electric signal is affected by voltage, the electric signal actually output can differ to some extent from the electric signal which the controller intends to output. That is, the driving duty cycle represented by the electric signal actually input into the duty solenoid valve differs from the driving duty cycle the controller has determined, which causes an error in the actual pilot pressure.

Further, as can be understood from the comparison of the pilot pressure change curves A1 to A4, the rate of reduction of the pilot pressure in the low duty cycle range (where the draining time is short) becomes very low when the oil temperature is low as compared with when the oil temperature is high. This is because, when the oil temperature is low, the viscosity of the hydraulic oil is high and the amount of oil drained in a unit time is small. This tendency is enhanced as the driving period is shortened and the draining time in one cycle becomes shorter. These facts cause the rate of change of the pilot pressure for a given change in the value of the duty signal to vary depending on the oil temperature and the driving period. Also the control width is caused to vary depending on the oil temperature and the driving period.

Accordingly, if it is assumed that the driving duty cycle which the controller determines corresponding to a target pilot pressure P1 is d1 and the driving duty cycle represented by the electric signal actually input into the duty solenoid valve is d2 with the pilot pressure corresponding to the driving duty cycle d2 represented by P2, the difference between the target pilot pressure P1 and the actual pilot pressure P2 corresponding to the driving duty cycle d2 is relatively small when the oil temperature is high and the driving period is short, while the difference between the target pilot pressure P1 and the actual pilot pressure P2 for the same difference between d1 and d2 is relatively large when the oil temperature is low and the driving period is short. That is, when the oil temperature is low and the driving period is short, the pressure regulation performance deteriorates. In other words, as the inclination of the pilot pressure change curve increases, the pressure regulation performance deteriorates more rapidly. Since the control width narrows as the inclination of the pilot pressure change curve increases, the pressure regulation performance deteriorates more rapidly, as the control width becomes narrower.

The pilot pressure oscillation is generated in response to the on and off states of the duty signal and is evaluated on the basis of the driving period and the amplitude of the oscillation. In the case of the pilot pressure oscillation waveforms V2 and V4 for the shorter driving period (70 Hz), the duty solenoid valve is turned on and off twice as often as in the case of the pilot pressure oscillation waveforms V1 and V3 for the longer driving period (35 Hz).

The pilot pressure oscillation generated while gear-shifting is being effected fluctuates the working hydraulic pressure to the brakes or the clutches and causes fluctuation in the torque transmitted by the brakes or the clutches. As a result, the pilot pressure oscillation is felt as a vibration of the vehicle body. Generally, vibration of the vehicle body is harder to feel as the frequency of the vibration increases. From this viewpoint, pilot pressure oscillation having a shorter period is preferable to that having a longer period.

The amplitude of the pilot pressure oscillation is affected by the oil temperature and the driving period. That is, so long as the driving period is the same, the amplitude of the pilot pressure oscillation is larger when the oil temperature is high than when the oil temperature is low as can be understood from the comparison of the pilot pressure oscillation waveforms V1 and V3 or V2 and V4. This is because the viscosity of the hydraulic oil is lowered as the oil temperature increases and the flow of the hydraulic oil during the on times increases, whereby the fluctuation in the pilot pressure increases. Even when the oil temperature is the same, the amplitude of the pilot pressure oscillation for a given duty cycle is larger when the driving period is longer than when the driving period is shorter as can be understood from the comparison of the pilot pressure oscillation waveforms V1 and V2 or V3 and V4. This is because when the driving period is long, the on time in each cycle is long, and accordingly, the amount of the hydraulic oil which flows in the on time in each cycle is larger.

The response performance is defined to be the rate of change of the pilot pressure in response to a change in the duty cycle, and tends to deteriorate as the oil temperature is lowered and the fluidity of the hydraulic oil drops. Further, the response performance improves as the driving period becomes shorter.

When a shorter driving period (e.g., 70 Hz) is adopted, the pilot pressure regulation performance is unsatisfactory when the oil temperature is low though the pilot pressure control properties are acceptable when the oil temperature is high. On the other hand, when a longer driving period (e.g., 35 Hz) is adopted, the pilot pressure oscillation and the response performance deteriorate when the oil temperature is high though the pilot pressure regulation performance is acceptable.

SUMMARY OF THE INVENTION

In view of the foregoing observations and description, the primary object of the present invention is to provide a duty solenoid valve control system for an automatic transmission which can obtain excellent pilot pressure control properties over a wider oil temperature range.

The duty solenoid valve control system in accordance with the present invention controls a duty solenoid valve which in turn controls a pilot pressure to be fed to a hydraulic pressure control valve which produces a hydraulic pressure according to the pilot pressure in an automatic transmission, and is characterized by having an oil temperature detecting means for detecting the temperature of the hydraulic oil and a driving period changing means which receives an output from the oil temperature detecting means and changes the driving period of the duty solenoid valve according to the temperature of the hydraulic oil so that the driving period is long when the temperature of the hydraulic oil is low and short when the temperature of the hydraulic oil is high.

With this arrangement, the pilot pressure regulation performance when the oil temperature is low improves since the driving period of the duty solenoid valve is increased and the control width is enlarged when the oil temperature is low, and at the same time, the pilot pressure oscillation is suppressed and the response performance improves when the oil temperature is high since the driving period of the duty solenoid valve is shortened when the oil temperature is high. When the oil temperature is high, the pilot pressure regulation performance does not deteriorate much even if the driving period of the duty solenoid valve is shortened since the pilot pressure regulation performance is improved in response to the lowering of the viscosity of the hydraulic oil as can be understood from the description above.

DESCRIPTION OF THE PREFERRED EMBODIMENT

Figure 1:
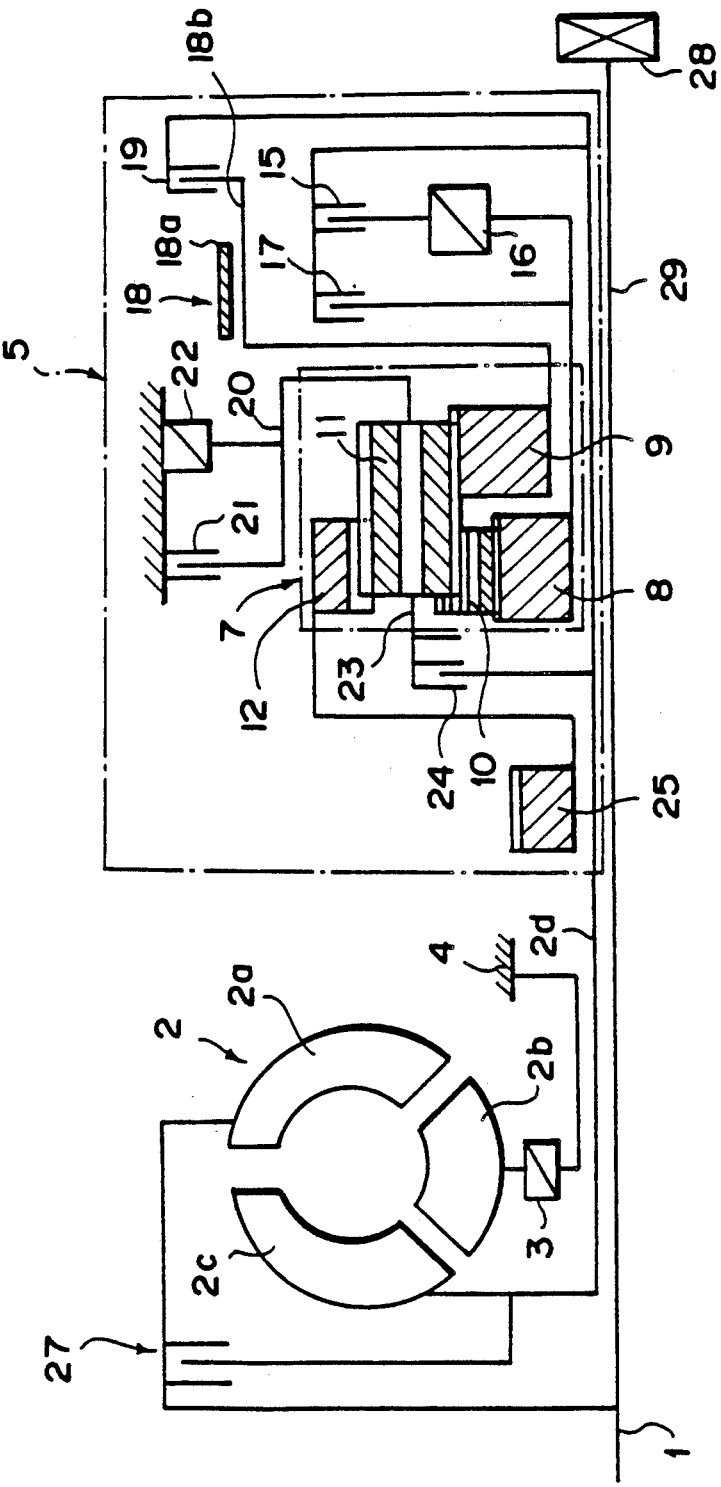
FIG. 1 is a schematic view showing an automatic transmission provided with a duty solenoid valve control system in accordance with an embodiment of the present invention.

In FIG. 1, a four-speed automatic transmission has a torque converter 2 comprising pump 2a connected to an engine output shaft 1, a stator 2b and a turbine 2c. The stator 2b is connected to a casing 4 by way of a converter one-way clutch 3 which allows the stator 2b to revolve in the same direction as the turbine 2c but locks up the stator 2b if it tries to revolve in the direction reverse to that in which the turbine 2c revolves. Reference numeral 5 denotes a transmission gear system which is connected to a converter output shaft 2d connected to the turbine 2c.

The transmission gear system 5 has a planetary gear mechanism 7 which comprises a small sun gear 8, a large sun gear 9, a short pinion 10 in mesh with the small sun gear 8, a long pinion 11 in mesh with both the large sun gear 9 and the short pinion 10, and a ring gear 12. The small sun gear 8 is connected to the converter output shaft 2d by way of a forward clutch 15 and a first one-way clutch 16 and by way of a coast clutch 17. The first one-way clutch 16 is connected in series with the forward clutch 15 and prevents the reversion of the converter output shaft 2d. The coast clutch 17 is connected in parallel with the forward clutch 15 and the first one-way clutch 16. The large sun gear 9 is connected to the converter output shaft 2d by way of a 2-4 brake 18 and a reverse clutch 19. The long pinion 11 is connected to a rear carrier 20 and a front carrier 23. A low and reverse brake 21 which locks up the long pinion 11 and a second one-way clutch 22 which permits the long pinion 11 to revolve in the same direction as the engine output shaft 1 are connected to the long pinion 11 by way of the rear carrier 20 in parallel to each other. The front carrier 23 is connected to the converter output shaft 2d by way of a 3-4 clutch 24. The ring gear 12 is connected to an output gear 25. Reference numerals 28 and 29 respectively denote an oil pump which is driven by the engine output shaft 1 by way of an intermediate shaft 4, and a lockup clutch which directly connects the engine output shaft 1 and the converter output shaft 2d.

Figure 2:
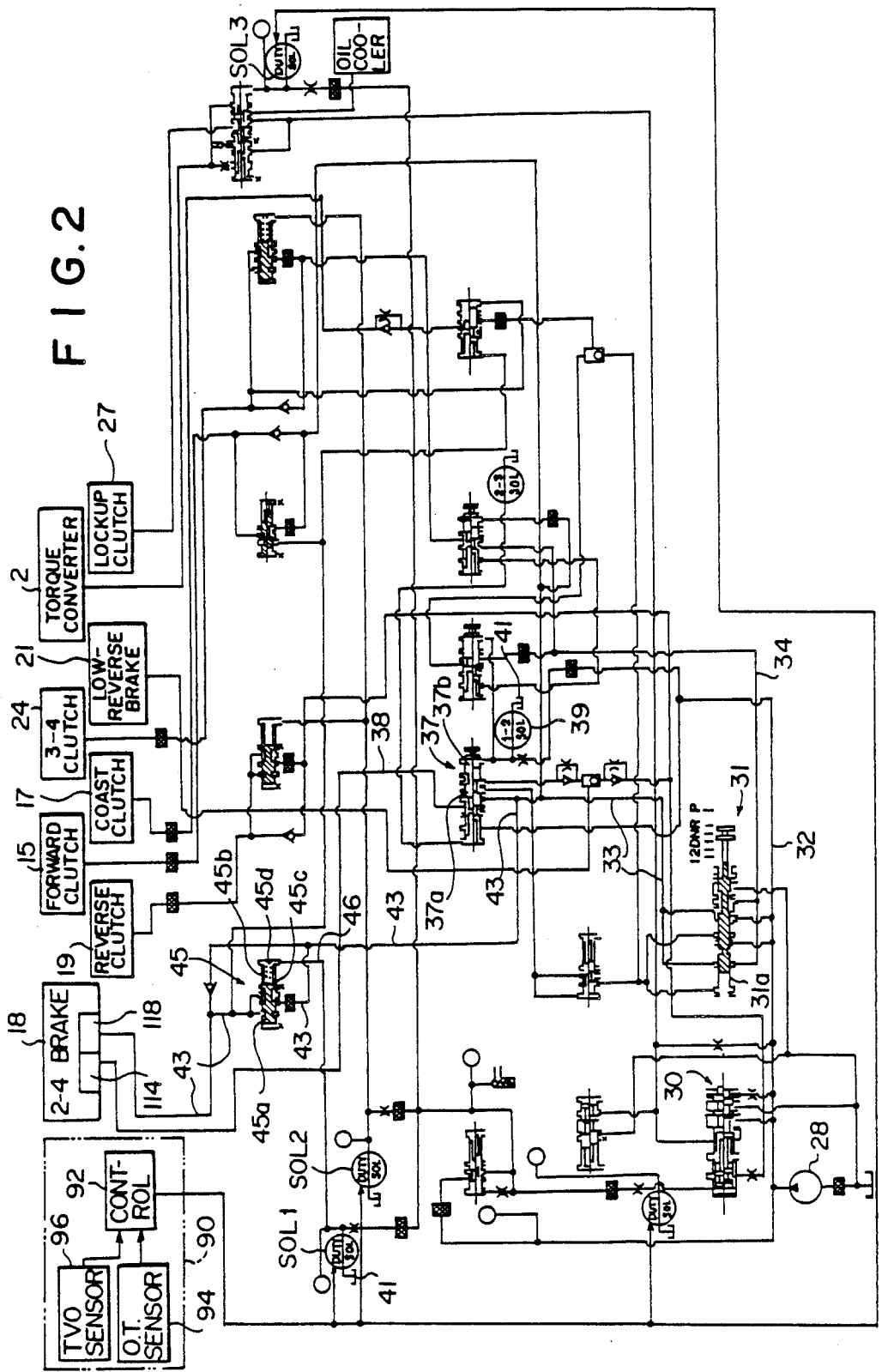
FIG. 2 is a block diagram showing the hydraulic system of the automatic transmission.

FIG. 2 shows the hydraulic system for controlling the automatic transmission shown in FIG. 1. The hydraulic system has a duty solenoid valve control system 90 in accordance with an embodiment of the present invention. The duty solenoid valve control system 90 comprises control unit 92, an oil temperature sensor 94, and a throttle opening sensor 96. The hydraulic system shown in FIG. 2 per se is known, and accordingly, the part which is not directly related to the present invention will not be described, here.

The operation of the duty solenoid valve control system 100 of this embodiment will be described mainly in conjunction with the 2-4 brake 18, hereinbelow. The 2-4 brake 18 is applied when the transmission upshifts from first to second or from third to fourth in D-, 2- or 1-range. In FIG. 2, reference numerals 30 and 31 respectively denote a pressure regulator valve which regulates the hydraulic pressure from the pump 28 and produces a line pressure, and a manual valve which is connected to a line pressure passage 32. The manual valve 31 has a spool 31a connected to a select lever which is manually operated by a driver. When the select lever is in D, 2 or 1, the spool 31a causes the line pressure passage 32 to communicate with a hydraulic pressure line 33 for applying the 2-4 brake 18.

A 1-2 shift valve 37 is connected to the hydraulic pressure line 33 and an application side oil chamber 114 of a servo mechanism 110 (FIG. 3) for the 2-4 brake 18 is connected to the 1-2 shift valve 37 by way of a communication passage 38. When a 1-2 solenoid 39 is energized and the hydraulic pressure acting on the right pressure chamber 37b of the 1-2 shift valve 37 is drained to a reservoir 41, the spool 37a of the 1-2 shift valve 37 is moved rightward and the communicating passage 38 is communicated with the hydraulic pressure line 33, whereby hydraulic pressure is applied to the application side oil chamber 114. The 1-2 solenoid 39 is energized when the transmission is in a gear speed not lower than second. A release side oil chamber 118 of the servo mechanism 110 is connected to the hydraulic pressure line 33 upstream from the 1-2 shift valve 33 by way of a hydraulic pressure line 43 for releasing the 2-4 brake 18, and a servo pressure control valve 45 is provided in the hydraulic pressure line 43 in order to regulate the hydraulic pressure acting on the release side oil chamber 118.

Figure 3:
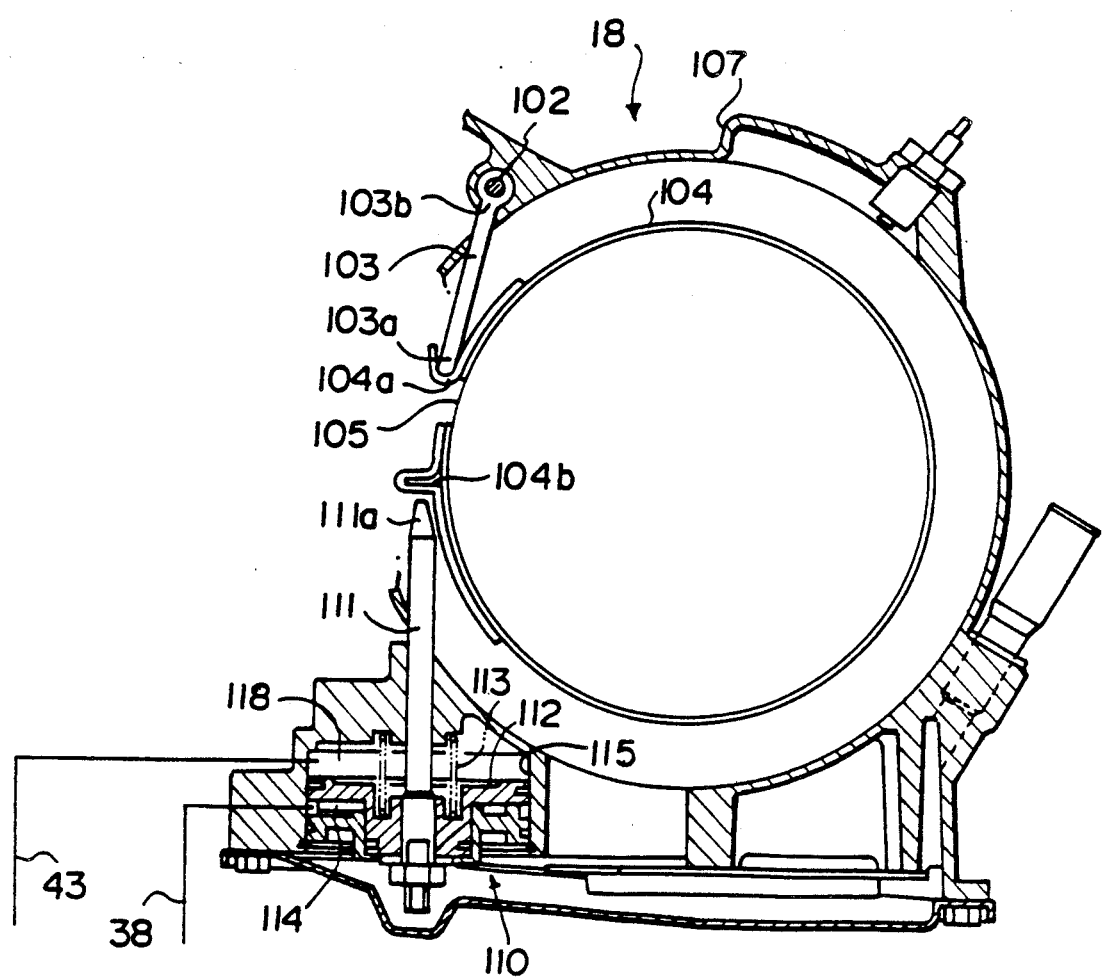
FIG. 3 is an enlarged cross-sectional view showing the 2-4 brake.

As shown in FIG. 3, the 2-4 brake 18 comprises a brake drum 105 which is positioned around the planetary gear mechanism 7 and is connected to the ring gear 12 (not shown In FIG. 3), and a brake band 104 wrapped around the brake drum 105. An anchor end portion 104a of the brake band 104 is supported on one end 103a of a support rod 103 which is pivoted at the other end 103b on a transmission casing 107 by a support pin 102. Thus, the anchor end portion 104a of the brake band 104 is fixedly mounted on the transmission casing 107 by way of the support rod 103 and the support pin 102.

The servo mechanism 110 comprises a cylinder 115 formed in the transmission casing 107, and a piston 112 which is slidably received by the cylinder 115 and divides the inside of the cylinder 115 into the application side oil chamber 114 and the release side oil chamber 118. A piston rod 111 connected to the piston 112 projects upward and the upper end 111a of the piston rod 111 is opposed to the other end 104b of the brake band 104. The piston 112 is urged toward the application side oil chamber 114 by a spring 113. When the line pressure is applied to the application side oil chamber 114 and the hydraulic pressure in the release side oil chamber 118 is released, the piston 112 is moved upward overcoming the force of the spring 113. When the piston 112 is moved upward, the upper end 111a of the piston rod 111 pushes the end 104a of the brake band 104 so as to hold the brake drum 105, whereby the 2-4 brake 18 is applied. The effective pressure receiving area of the piston 112 is larger on the side of the release side oil chamber 118 than on the side of the application side oil chamber 114, and accordingly, the 2-4 brake 18 cannot be applied even if the line pressure is applied to the application side oil chamber 114 until the line pressure acting on the release side oil chamber 118 is released.

The servo pressure control valve 45 (FIG. 2) has a spool 45a and a spring 45b which is accommodated in a spring chamber 45d on the right side of the spool 45a and urges the spool 45a leftward (as seen in FIG. 2). The hydraulic pressure in the hydraulic pressure line 43 acts on the left side of the spool 45a. The spring chamber 45d is connected to a hydraulic pressure regulation passage 46 and the hydraulic pressure in the passage 46 acts on the spool 45a as a pilot pressure as will be described in detail later. The servo pressure control valve 45 is further provided with a drain port 45c.

The hydraulic pressure in the passage 46, that is, the pilot pressure to the servo pressure control valve 45, is regulated by a first duty solenoid valve SOL1 which causes the passage 46 to communicate with the reservoir 41. The first duty solenoid valve SOL1 regulates the pilot pressure by draining the passage 46 under the control of a duty signal delivered from the control system 90. That is, in order to regulate the pilot pressure the duty cycle of the first duty solenoid valve SOL1 is controlled. The servo pressure control valve 45 controls the hydraulic pressure in the release side oil chamber 118 on the basis of the pilot pressure in the known manner.

The control unit 92 determines the duty cycle and the driving period of the first duty solenoid valve SOL1 according to the engine load and the oil temperature respectively input from the throttle opening sensor 96 and the oil temperature sensor 94. The operation of the control unit 92 will be described in conjunction with shifting the gears from first to second by way of example.

Figure 4:
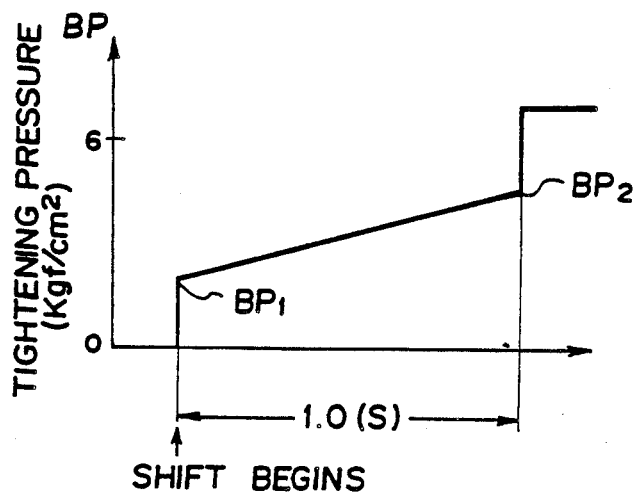
FIG. 4 shows an example of the manner for determining the duty cycle of the duty solenoid valve.
Figure 4:
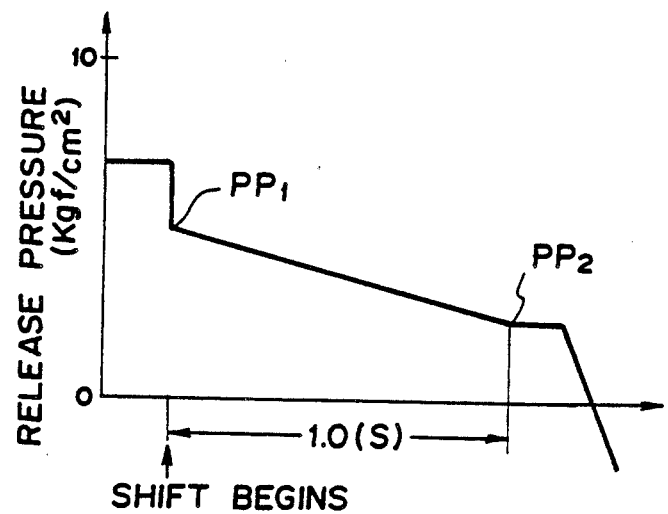
Figure 4:
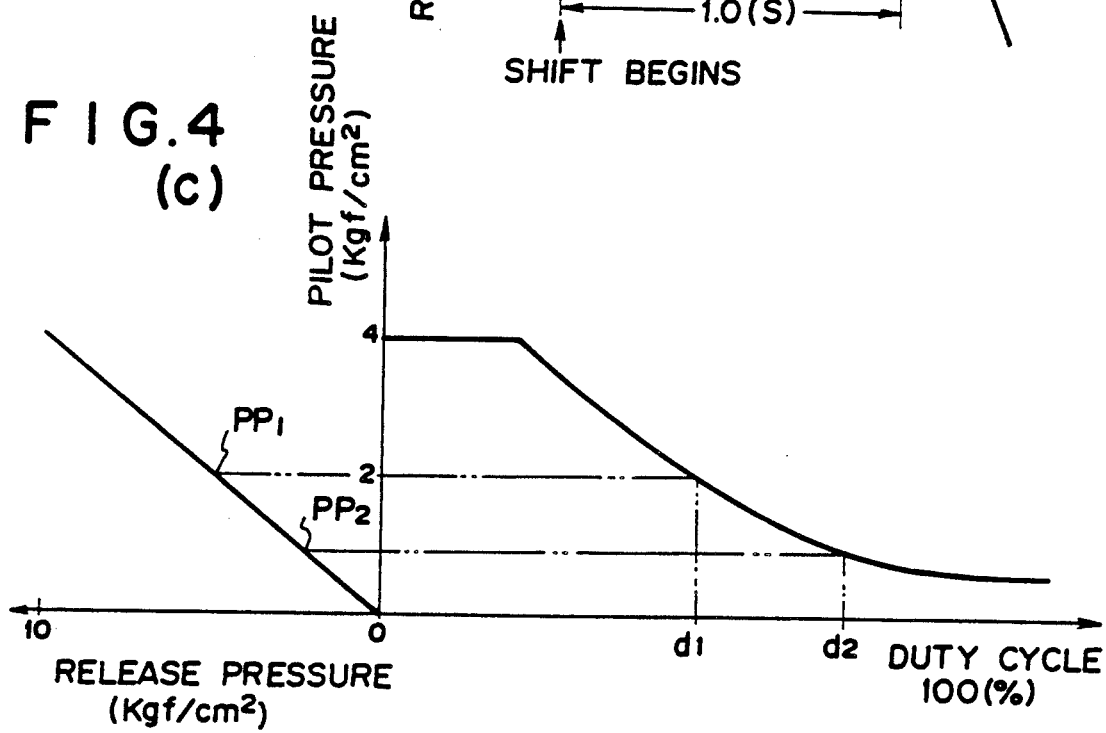

The control unit 92 determines a band tightening pressure requirement BP2 which is the pressure which the servo mechanism 110 is required to exert on the brake band 104 in order to stop the brake drum 105 of the 2-4 brake 18 on the basis of the engine load. Then the control unit 92 determines an initial band tightening pressure BP1 which is the pressure which the servo mechanism 110 is required to exert on the brake band 104 when the shifting of the gears is begun. Thereafter, the control unit 92 determines the band tightening pressure changing rate so that the band tightening pressure is increased from the initial band tightening pressure BP1 to the band tightening pressure requirement BP2 in a predetermined gear-shifting time, e.g., 1 second. That is, the band tightening pressure is gradually increased from the initial band tightening pressure BP1 to the band tightening pressure requirement BP2 in order to gradually apply the 2-4 brake 18 and suppress the generation of a torque shock. FIG. 4(a) shows an example of the change in the tightening pressure in a case where the throttle opening is 4/8 and the gear-shifting time is 1 second. Since the pressure exerted on the brake band 104 by the servo mechanism 110 corresponds to the difference between the hydraulic pressure in the application side oil chamber 114 and that in the release side oil chamber 118, and is controlled, in this particular embodiment, by a change in the hydraulic pressure in the latter with the hydraulic pressure in the former kept constant, the control unit 92 then determines the change in the hydraulic pressure in the release side oil chamber 118 corresponding to the change in the tightening pressure from BP1 to BP2. FIG. 4(b) shows an example of the change in the hydraulic pressure in the release side oil chamber 118. In FIG. 4(b), PP1 and PP2 respectively denote the hydraulic pressures in the release side oil chamber 118 corresponding to the initial band tightening pressure BP1 and the band tightening pressure requirement BP2. Further, since the hydraulic pressure in the release side oil chamber 118 is controlled by the pilot pressure on the servo pressure control valve 45 which is in turn controlled by the duty cycle of the first duty solenoid valve SOL1, the control unit 92 determines the duty cycles d1 and d2 respectively corresponding to PP1 and PP2 on the basis of the relation between the pilot pressure and the duty cycle which is selected according to the driving period of the duty solenoid valve 41 which is selected according to the oil temperature. In accordance with the present invention, the driving period of the duty solenoid valve 41 is selected so that the driving period is shortened as the temperature increases. FIG. 4(c) shows the relation among the hydraulic pressure in the release side oil chamber 118, the duty cycle and the pilot pressure when the oil temperature is −15° C. and the driving frequency is set at 35 Hz.

With this arrangement, the pilot pressure regulation performance when the oil temperature is low improves, and at the same time, the pilot pressure oscillation can be suppressed and the response performance improves without any adverse effects on the pilot pressure regulation performance when the oil temperature is high as described above. Further, since the frequency of the vibration of the vehicle body increases as the driving period of the duty solenoid valve 41 is shortened, the vibration of the vehicle body becomes harder to feel when the oil temperature is high.

Figure 5:
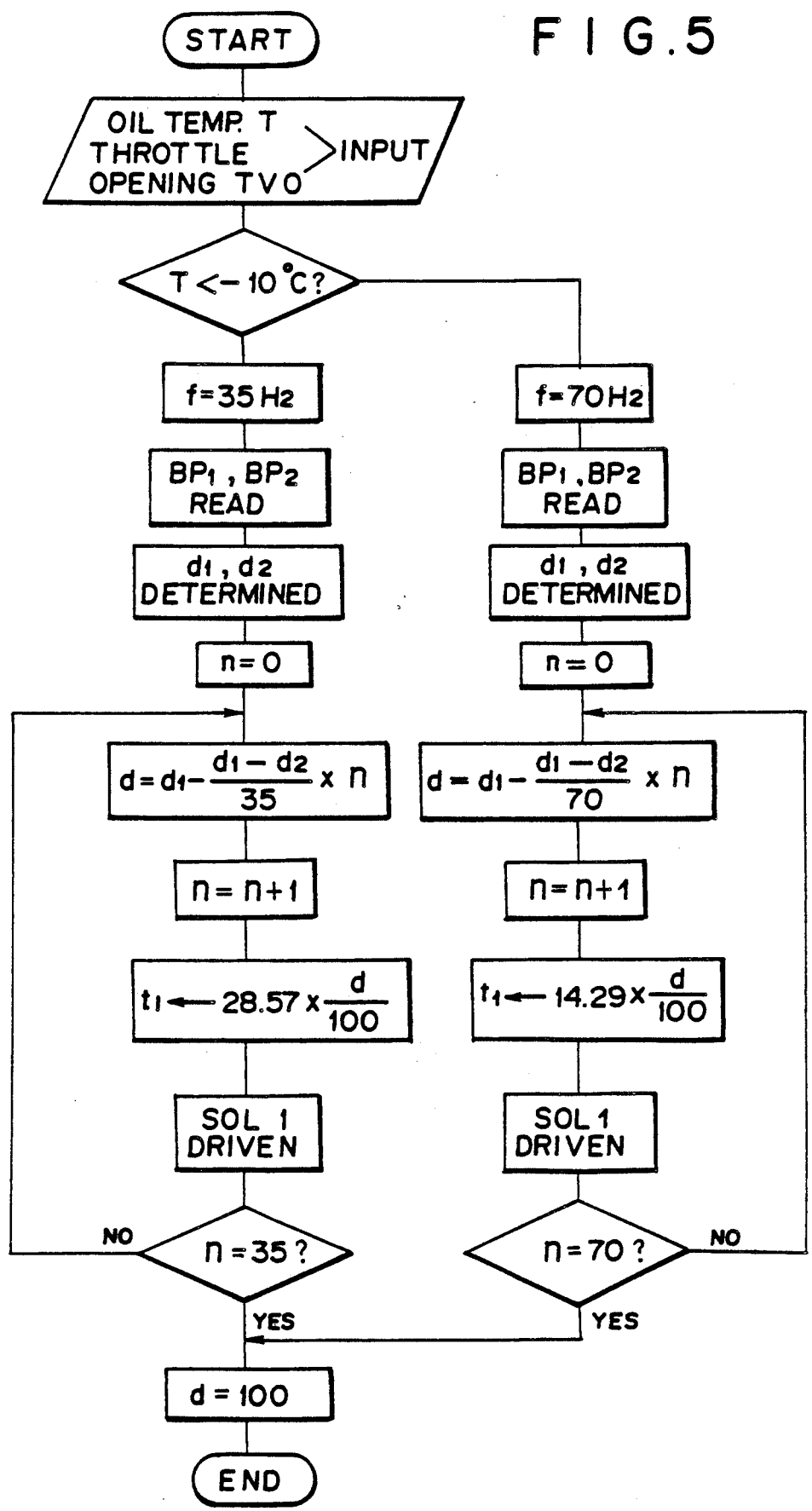
FIG. 5 is a flow chart for illustrating the operation of the unit.
Figure 6:
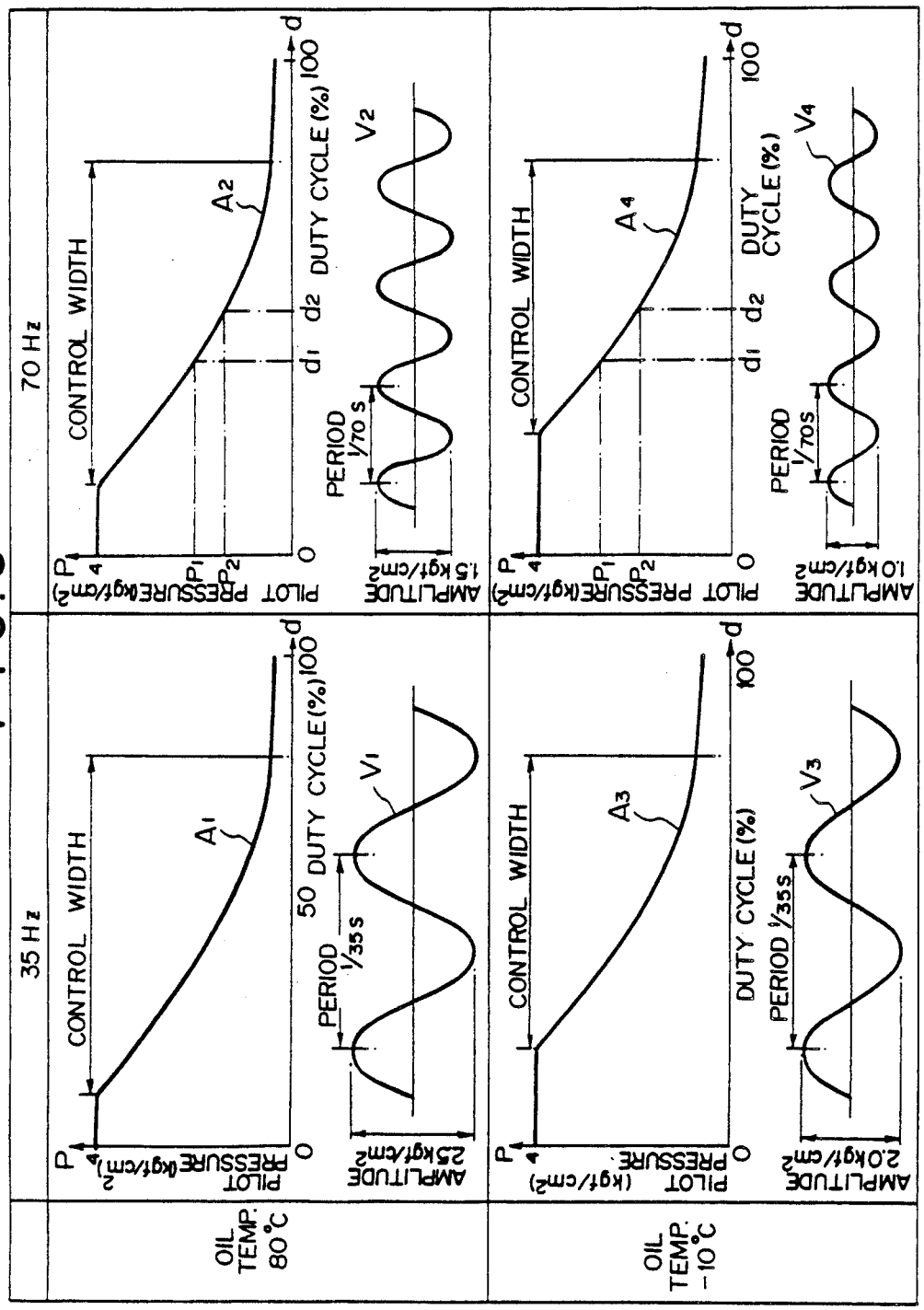
FIG. 6 illustrates the problem to be solved by the present invention.

FIG. 5 show a flow chart for illustrating the operation of the control unit 92 described above. In FIG. 5, d and t respectively denote the duty cycle and the driving period.

We claim:

1. A duty solenoid valve control system for controlling a duty solenoid valve which controls a pilot pressure to be fed to a hydraulic pressure control valve which produces a hydraulic pressure according to the pilot pressure in an automatic transmission including an oil temperature detecting means for detecting the temperature of the hydraulic oil and a driving period changing means which receives an output from the oil temperature detecting means and changes the driving period of the duty solenoid valve according to the temperature of the hydraulic oil so that the driving period is long when the temperature of the hydraulic oil is low and short when the temperature of the hydraulic oil is high, said hydraulic pressure control valve produces a hydraulic pressure for driving a friction element which is selectively applied or released in order to change the power transmitting path of the automatic transmission, thereby effecting gear-shifting, said friction element having a piston which applies and releases the friction element and the hydraulic pressure produced by the hydraulic pressure control valve acting on the piston, wherein the hydraulic pressure which acts on the piston during the shifting of the gears is changed in a predetermined manner which is determined according to the engine load, and the duty cycle of the duty solenoid valve is changed so that the pilot pressure is changed, which controls the hydraulic pressure control valve so that it changes the hydraulic pressure control predetermined manner, the change in the duty cycle being determined taking into account the driving period of the duty solenoid valve which is determined according to the oil temperature, and wherein said piston is urged to release said friction element by hydraulic pressure in a first hydraulic pressure chamber and at the same time urged to apply the same by hydraulic pressure in a second hydraulic pressure chamber so that the piston applies the friction element when the hydraulic pressure in the first hydraulic pressure chamber becomes lower than the hydraulic pressure in the second hydraulic pressure chamber, and said hydraulic pressure control valve changes the hydraulic pressure in the first hydraulic pressure chamber with the hydraulic pressure in the second hydraulic pressure chamber kept constant.

2. A duty solenoid valve control system for controlling a duty solenoid valve which controls a pilot pressure to be fed to a hydraulic pressure control valve which produces a hydraulic pressure according to the pilot pressure in an automatic transmission including an oil temperature detecting means for detecting the temperature of the hydraulic oil and a driving period changing means which receives an output from the oil temperature detecting means and changes the driving period of the duty solenoid valve according to the temperature of the hydraulic oil so that the driving period is long when the temperature of the hydraulic oil is low and short when the temperature of the hydraulic oil is high, said hydraulic pressure control valve produces a hydraulic pressure for driving a friction element which is selectively applied or released in order to change the power transmitting path of the automatic transmission, thereby effecting gear-shifting, said friction element having a piston which applies and releases the friction element and the hydraulic pressure produced by the hydraulic pressure control valve acting on the piston, wherein the hydraulic pressure which acts on the piston during the shifting of the gears is changed in a predetermined manner which is determined according to the engine load, and the duty cycle of the duty solenoid valve is changed so that the pilot pressure is changed, which controls the hydraulic pressure control valve so that it changes the hydraulic pressure in the predetermined manner, the change in the duty cycle being determined taking into account the driving period of the duty solenoid valve which is determined according to the oil temperature, and wherein said piston is urged to release said friction element by hydraulic pressure in a first hydraulic pressure chamber and at the same time urged to apply the same by hydraulic pressure in a second hydraulic pressure chamber so that the piston applies the friction element when the hydraulic pressure in the first hydraulic pressure chamber becomes lower than the hydraulic pressure in the second hydraulic pressure chamber, and said hydraulic pressure control valve changes the hydraulic pressure in the first hydraulic pressure chamber.

3. A duty solenoid valve control system for controlling a duty solenoid valve which controls a pilot pressure to be fed to a hydraulic pressure control valve which produces a hydraulic pressure according to the pilot pressure in an automatic transmission including an oil temperature detecting means for detecting the temperature of the hydraulic oil and a driving period changing means which receives an output from the oil temperature detecting means and changes the driving period of the duty solenoid valve according to the temperature of the hydraulic oil so that the driving period is long when the temperature of the hydraulic oil is low and short when the temperature of the hydraulic oil is high, said hydraulic pressure control valve produces a hydraulic pressure for driving a friction element which is selectively applied or released in order to change the power transmitting path of the automatic transmission, thereby effecting gear-shifting, said friction element having a piston which applies and releases the friction element and the hydraulic pressure produced by the hydraulic pressure control valve acting on the piston, wherein the hydraulic pressure which acts on the piston during the shifting of the gears is changed in a predetermined manner which is determined according to the engine load, and the duty cycle of the duty solenoid valve is changed so that the pilot pressure is changed, which controls the hydraulic pressure control valve so that it changes the hydraulic pressure in the predetermined manner, the change in the duty cycle being determined taking into account the driving period of the duty solenoid valve which is determined according to the oil temperature, and wherein said piston is urged to release said friction element by hydraulic pressure in a first hydraulic pressure chamber and at the same time urged to apply the same by hydraulic pressure in a second hydraulic pressure chamber so that the piston applies the friction element when the hydraulic pressure in the first hydraulic pressure chamber becomes lower than the hydraulic pressure in the second hydraulic pressure chamber, and said hydraulic pressure control valve changes the hydraulic pressure in one of the first and second hydraulic pressure chambers with the hydraulic pressure in the other of the first and second hydraulic pressure chambers kept constant.

* * * * *